United States Patent [19]
Frommelt

[11] 3,915,183
[45] Oct. 28, 1975

[54] LOADING DOCK SHELTERS
[75] Inventor: Sylvan J. Frommelt, Dubuque, Iowa
[73] Assignee: Dubuque Awning & Tent Company, Dubuque, Iowa
[22] Filed: June 20, 1974
[21] Appl. No.: 481,308

Related U.S. Application Data
[63] Continuation of Ser. No. 323,509, Jan. 15, 1973, abandoned.

[52] U.S. Cl.......... 135/5 A; 135/15 CF; 297/DIG. 6
[51] Int. Cl.² .................... E06B 9/00; E06B 5/00
[58] Field of Search .......... 135/15 CF, 5 A; 52/173, 52/173 DS, 204; 297/DIG. 6; 24/204; 2/DIG. 6

[56] References Cited
UNITED STATES PATENTS

| | | | |
|---|---|---|---|
| 1,057,628 | 4/1913 | Eberhardt | 135/15 CF |
| 2,319,292 | 5/1943 | Boggs | 135/15 CF |
| 3,143,154 | 8/1964 | Best | 297/DIG. 6 |
| 3,175,603 | 3/1965 | Tonnon | 160/354 |
| 3,235,926 | 2/1966 | Mates | 24/204 |
| 3,286,417 | 11/1966 | Dazzo | 52/173 DS |
| 3,455,589 | 7/1969 | Valiulis | 24/204 |
| 3,461,627 | 8/1969 | Conger | 52/173 DS |
| 3,638,667 | 2/1972 | Frommelt et al. | 135/5 A |
| 3,772,839 | 11/1973 | Timbers | 135/5 A |

*Primary Examiner*—Werner H. Schroeder
*Assistant Examiner*—Conrad L. Berman
*Attorney, Agent, or Firm*—Root & O'Keeffe

[57] ABSTRACT

A loading dock shelter having side curtains which are pulled into draping engagement with a truck, and which are quickly releasably secured to a head curtain.

4 Claims, 6 Drawing Figures

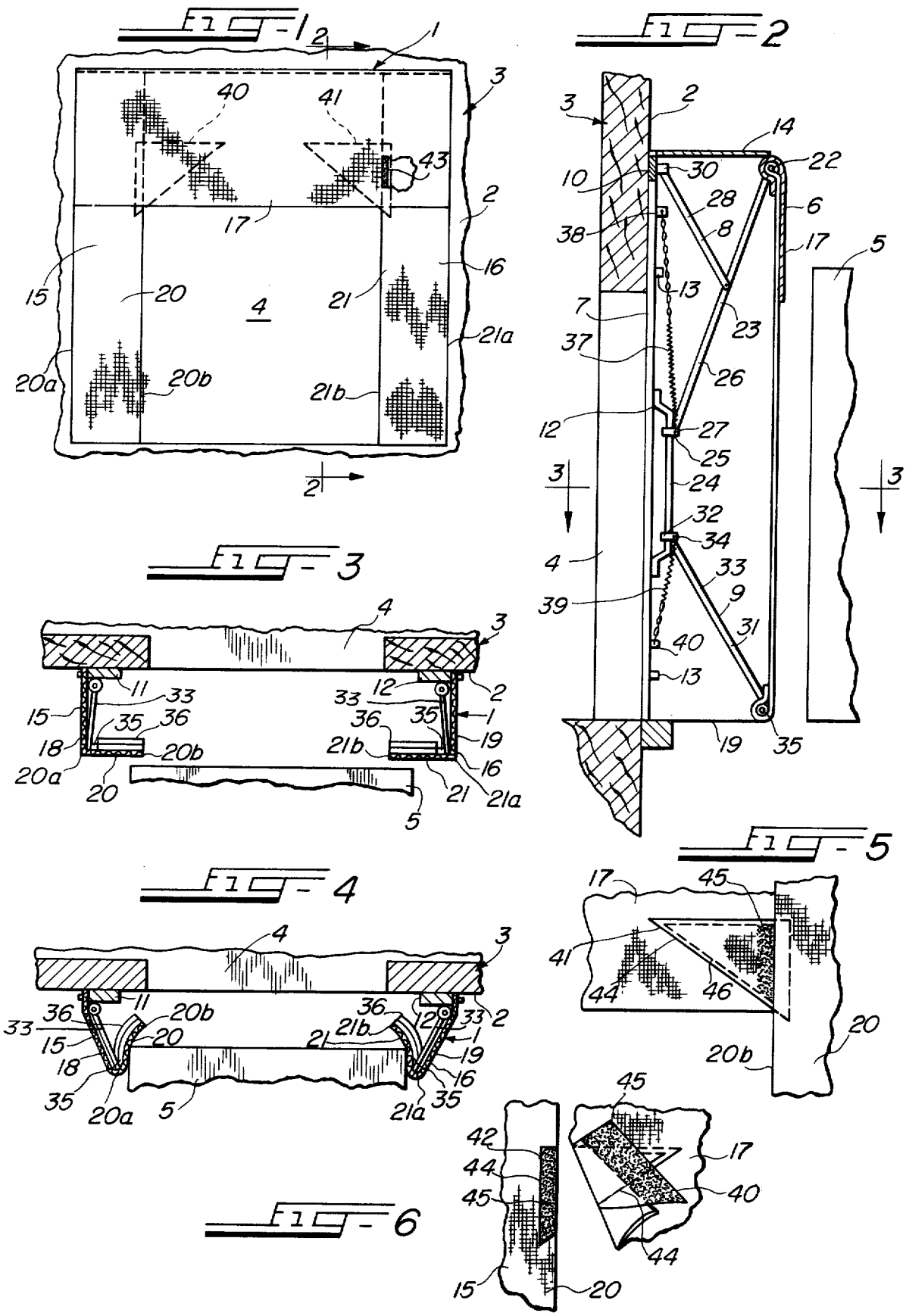

3,915,183

LOADING DOCK SHELTERS

BACKGROUND OF THE INVENTION

This is a continuation of application Ser. No. 323,509, filed Jan. 15, 1973, now abandoned.

This application relates to loading dock shelters, and more particularly, to loading dock shelters which are particularly well adapted for use as truck dock shelters.

It is a primary object of the present invention to afford a novel loading dock shelter.

Another object of the present invention is to afford a novel loading dock shelter of the type, embodying head and side curtains, and, more particularly, a novel loading dock shelter of the type wherein the side curtains thereof are pulled in a positive manner into sealing engagement with the sides of a truck, when the truck is operatively engaging the shelter.

As used herein, "drape type" loading dock shelters may be understood to be of those types which embody walls or curtains, which consist of fabric or sheet material supported in more or less a tentlike manner and which will drape around a truck in sealing engagement therewith, as distinguished from fabric or sheet material affording a casing of a pad or pillow, or the like.

Loading dock shelters of such drape type have been heretofore known in the art, being shown, for example in U.S. Pat. Nos. 2,892,463, 3,557,508 and 3,638,667, with respect to which I am a co-inventor. However, in such loading dock shelters of the drape type heretofore known in the art, of which I have knowledge, the head curtains thereof either are completely unattached to the side curtains or are permanently attached thereto such as by stitching, and the like.

It is an important object of the present invention to afford a novel drape type loading dock shelter.

Another object of the present invention is to afford a novel drape type loading dock shelter, wherein the head curtain thereof is secured to the side curtains thereof in a novel and expeditious manner.

Another object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

SUMMARY OF THE INVENTION

The present invention affords a novel loading dock shelter embodying a cover having a head curtain for extending across the top of a warehouse doorway, or the like, and two side curtains for extending along the respective opposite sides of the doorway, with the head curtain and side curtains releasably secured together in such a manner that they may be quickly and easily released and that they will automatically be released if predetermined force is applied to the head curtain in a direction outwardly away from the building on which the dock shelter is mounted, while affording a sufficiently strong fastening of the head curtain to the side curtains that engagement of the head curtain by a truck will be effective to pull the side curtains into effective sealing engagement with the sides of the truck.

DESCRIPTION OF THE DRAWINGS

In the drawings:

FIG. 1 is a front elevational view of a loading dock shelter embodying the principles of the present invention, with the shelter shown mounted in operative position around the doorway of a warehouse;

FIG. 2 is a sectional view taken substantially along the line 2—2 in FIG. 1;

FIG. 3 is a sectional view taken substantially along the line 3—3 in FIG. 2;

FIG. 4 is a sectional view, similar to FIG. 3, but showing the parts thereof disposed in different operative positions;

FIG. 5 is a fragmentary, rear elevational view of a portion of the loading dock shelter shown in FIG. 1; and FIG. 6 is a view similar to FIG. 5, but showing the parts thereof in different operative positions.

DESCRIPTION OF THE EMBODIMENT SHOWN HEREIN

A loading dock shelter 1, embodying the principles of the present invention, is shown in the drawings to illustrate the presently preferred embodiment of the present invention.

It is shown mounted on an outer wall 2 of a warehouse 3 in surrounding relation to a doorway 4 in the warehouse wall, FIG. 1. As will be discussed in greater detail presently, the shelter 1 is operable to afford an effective shelter between a truck 5, FIGS. 2–4, and the doorway 4, when, as shown in FIG. 4, the truck 5 is disposed in normal operative position relative to the doorway 4 for loading and unloading operations to be effected through the doorway 4 and the rear end of the truck 5.

The loading dock shelter 1 is of the same general type of construction as shown in the aforementioned U.S. Pat. No. 3,638,667. It embodies, in general, a cover 6 supported from a supporting frame 7 by an upper supporting unit 8 and a lower supporting unit 9, which units are preferably vertically spaced from each other. In operation, the shelter 1 is mounted on the warehouse 3 in such position that the cover 6 is disposed around the doorway 4 and normally projects outwardly from the wall 2 in position to be operatively engaged by a truck, such as the truck 5, as will be discussed in greater detail presently.

The supporting frame 7 may be made of any suitable material such as, for example, wood, and embodies a substantially horizontally extending top rail or cross bar 10, FIG. 2, and two substantially vertically extending side rails 11 and 12, FIGS. 3 and 4. The side rails 11 and 12 are secured at their upper ends to respective opposite ends of the cross bar 10 and project downwardly therefrom. In operation, the frame is secured to the outer face of the warehouse wall 2 by suitable means such as bolts 13, FIG. 2, in such position that the cross bar 10 extends across the doorway 4 in upwardly spaced relation thereto, and the side rails 11 and 12 extend along respective opposite sides of the doorway 4 in outwardly spaced relation thereto.

The cover 6, which is mounted on the supporting frame 7 in position to be extended outwardly therefrom, embodies an elongated top wall 14, FIG. 2, two elongated side curtains 15 and 16, FIGS. 1, 3 and 4, extending downwardly from respective opposite ends of the top wall 14, and a head curtain 17, FIGS. 1 and 2, depending from the top wall 14. The side curtains 15 and 16 embody elongated side walls or side panels 18 and 19, respectively, extending forwardly from the supporting frame 7, and two elongated front walls or front panels 20 and 21, FIGS. 1, 3 and 4, having outer longitudinal edges 20a and 21a attached to and extending along the front longitudinal edges of the side panels 18 and 19, respectively, the front panels 20 and 21 extending inwardly toward each other from the side panels 18 and 19, and terminating in spaced relation to each other along longitudinal inner edges 20b and 21b, respectively. The side curtains 15 and 16 and the head curtain 17 may be made of any suitable material, but preferably they are made from a water repellent, wear resistant, flexible material, such as, for example, canvas duck or rubber-impregnated nylon fabric.

The supporting frame 7 is disposed at the rear of the loading dock shelter 1, and the rear longitudinal edges of the walls 14, 18 and 19 are secured to the rails 10—12, respectively, by suitable means such as nails or screws, not shown. The sidewalls 18 and 19 are secured along their upper ends to the respective opposite ends of the top wall 14 by suitable means such as sewing, and the head curtain 17 and the front walls 20 and 21 are similarly secured along their upper edges to the front longitudinal edge of the top wall 14. Also, the front walls 20 and 21 are similarly secured along their outer longitudinal edges 20a and 21a to the front longitudinal edges of the sidewalls 18 and 19, respectively.

The upper supporting unit 8 of the preferred form of the loading dock shelter 1 shown in the drawings is of the general type discolsed in the aforementioned U.S. Pat. No. 3,638,667. It embodies an elongated frame member 22, FIG. 2, disposed within the cover 6 and secured thereto along the junction of the top wall 14 with the head curtain 17 and the front walls 20 and 21. The frame member 22 preferably extends the full length of the top wall 14, and is supported at its opposite ends by suitable retractable, automatically extending, supporting mechanisms 23 disposed at respective opposite sides of the doorway 4. The supporting mechanisms 23 are identical in construction and operation, and only one such mechanism is shown in the drawings, FIG. 2, that being sufficient for an understanding thereof by those skilled in the art.

The supporting mechanism 23 mounted at the right side of the doorway 4, as viewed in FIG. 1, includes an elongated supporting member or mounting member in the form of an elongated bar 24, FIG. 2, which is round in transverse cross section and secured to the front face of the side rail 12 of the supporting frame 7 in longitudinally extending relation thereto. A slide member 25 is mounted on the bar 24 for reciprocation longitudinally thereof, and projects forwardly therefrom. The lower end of an arm or lever 26 is pivotally secured to the front end portion of the slide member 25 by suitable means such as a pin or bolt 27, FIG. 2. The upper end of the arm 26 is secured to the frame member 22. The lower end of another arm of lever 28 is pivotally secured to the arm 26, intermediate the ends of the latter, and the upper end of the arm 28 is pivotally secured by a pin or bolt to an arm or bar in the form of a bracket 30 stationarily secured to the upper end portion of the slide rail 12 and projecting forwardly therefrom. It will be understood that the upper supporting mechanism 23 at the other side of the doorway 4 is similarly mounted on the side rail 11 of the supporting frame 9.

Similarly, the lower supporting unit 9 of the preferred form of loading dock shelter 1 shown in the drawings is of the same general type as that disclosed in the aforementioned U.S. Pat. No. 3,638,667. It includes retractable, automatically extending, supporting mechanisms 31 disposed at respective opposite sides of the doorway 4, FIGS. 3 and 4. The supporting mechanisms 31 are identical in construction and operation.

As may best be seen in FIG. 2, the supporting mechanism 31 mounted at the right side of the doorway 4, as viewed in FIG. 1, includes the aforementioned elongated bar 24 mounted on the front face of the side rail 12 of the supporting frame 7. A slide member 32 is rotatably and slidably mounted on the bar 24 for rotation transversely thereof and reciprocation longitudinally thereof. The slide member 32 projects forwardly from the bar 24, and the upper end of another arm or lever 33 is pivotally secured to the front end of the slide member 32 by suitable means such as a pin or bolt 34, the arm 33 projecting downwardly and forwardly from the frame side member 12. Another elongated arm 35, preferably in the form of a resilient, elongated leaf spring or coil spring, which is flexible transversely to its length, has one end secured to the lower end of the arm 33, and the other end portion thereof is disposed in a hem 36 formed in the lower edge of the front wall 21 of the cover 6 in position to yieldingly urge the lower edge portion of the front wall 21 toward flat condition. The arm 35 and the hem 36 preferably are so disposed on the front wall 21 that, when the cover 6 is in normal fully extended position, as shown in FIGS. 1 and 2, the arm 35 projects substantially horizontally from the attached arm 33 toward the front wall 20 in parallel, forwardly spaced relation to the doorway 4. It will be understood that the lower suppporting mechanism 31 at the other side of the doorway 4 is similarly mounted on the side rail 11 of the supporting frame 7 and similarly secured to the front wall 20 of the cover 6.

As will be appreciated by those skilled in the art, the upper supporting mechanisms 23 embody a toggle joint afforded by the arms 26 and 28, and another toggle joint afforded by the arm 26 and the slide member 25; and the lower supporting mechanisms 31 embody a toggle joint afforded by the arm 31 and the slide member 32, FIG. 2. Each of the upper supporting mechanisms 23 embodies a coil spring 37 secured to the supporting frame 7 by suitable means such as a bracket 38 mounted on the respective one of the side rails 11 and 12, and has its lower end secured to the arm 26 in position to continuously urge the slide member 25 thereof upwardly along the bar 24 and thereby continuously afford an expanding force on the toggle joint afforded by the members 26 and 28 and on the toggle joint afforded by the members 25 and 26. The expanding force thus applied to each of the toggle joints in the supporting mechanisms 23 is effective to cause each of them to urge the cover 6 outwardly away from the supporting frame 9.

Similarly, in each of the lower supporting mechanisms 31, a tension coil spring 39 has its lower end connected to the supporting frame 9 by suitable means such as a bracket 40 secured to the respective one of the side rails 11 and 12, and has its upper end secured to the arm 33 in position to continuously urge the slide members 32 downwardly along the respective rods 24 and thereby continuously afford an expanding force on the toggle joints afforded by the pairs of members 32 and 33. This expanding force thus applied to each of the toggle joints in the supporting mechanisms 31 is effective to cause each of them to urge the cover 6 outwardly away from the frame 7.

In the preferred form of the invention shown in the drawings, the slide members 25 and 32 of the upper lower supporting mechanisms 23 and 31 disposed on the same side of the doorway 4 are shown mounted on the same supporting bar 24. However, as will be appreciated by those skilled in the art, this is merely by way of illustration and not by way of limitation, and individual supporting bars may be afforded for the slide members 25 and 32 without departing from the purview of the present invention.

It will be seen that with the loading dock shelter 1 constructed in the manner shown herein, the upper supporting unit 8 and the lower supporting unit 9 not only afford an effective support for the cover 6, but also apply a strong, but yieldable, extending force thereto thereby continuously urge the cover 6 into fully extended position and then continue to afford an extending force on it. Also, it will be seen that the springs 39 in the lower supporting mechanisms 31 yieldingly urge the arms 33 toward the substantially directly outwardly projecting relation to the warehouse 3 shown in FIGS. 2 and 3, and yieldingly hold the arms 33 against rotation on the arms 24 into more closely overlying relation to the doorway 4, such as shown in FIG. 4.

Preferably, the cover member 17 is of such length that it extends the full distance between the outer longitudinal edges 20a and 21a of the front panels 20 and 21 of the side curtains 15 and 16, respectively, when the cover 1 is disposed in fully extended position. Also, it will be observed that the head curtain 17 is disposed in outwardly overlying relation to the front faces of the front panels 20 and 21.

In the assembled loading shelter dock 1, shown in the drawings, the head curtain 17 is releasably secured to the side curtains 15 and 16 during normal operation of the dock shelter 1. The interconnection of the head curtain 17 with the side curtains 15 and 16 is of such a nature that, when the loading dock shelter 1 is in extended position, and the head curtain 17 is pushed rearwardly by a truck, such rearward movement of the head curtain 17 is effective to pull inwardly and rearwardly on the inner edge portions of the front panels 20 and 21 of the side curtains 15 and 16, respectively, to thereby afford an inward pulling force on the front longitudinal edge portions of the side panels 18 and 19 of the side curtains 15 and 16. This force applied ot the side curtains 15 and 16 is effective to rotate the arms 33 of the lower supporting unit 9 on their respective rods 24 from the normally substantially directly outwardly extending relation, as shown in FIG. 3, to a position wherein they are swung inwardly on the rods 24 into more closely overlying relation to the doorway 4, as shown in FIG. 4.

When a truck, such as the truck 5, is disposed in normal operative engagement with the loading dock shelter 1, it engages both the head curtain 17 and the side curtains 15 and 16 between the supporting mechanisms therefor disposed at opposite sides of the doorway 4, as illustrated in FIGS. 3 and 4. Such engagement of the truck 5 with the loading dock shelter 1, by reason of the flexible nature of the curtains 15-17, is effective to cause the head curtain 17 to drape itself across the top of the truck, and to cause the side curtains 15 and 16 to drape themselves across the respective adjacent sides of the truck. However, in addition, this engagement of the truck 5 with the curtains 15-17 is effective to pull the arms 33 of the lower supporting unit 9 around the rods 24 on which they are mounted inwardly toward the doorway 4 and thereby press the lower edge portions of the front walls 20 and 21 and the front longitudinal edges of the sidewalls 18 and 19 of the side curtains 15 and 16, respectively, into tight engagement with the respective adjacent sidewalls of the truck 5, as illustrated in FIG. 4. This movement of the arms 33, together with the pull afforded by the head curtain 17 on the side curtains 15 and 16 is effective to pull the front walls 20 and 21 and the longitudinal edges of the sidewalls 18 and 19 into tight sealing engagement with the adjacent repective sidewalls of the truck 5, substantially throughout the length of the side curtains 15 and 16 between the lower ends of the latter and the lower edge of the head curtain 15.

The releasable securing of the head curtain 17 to the side curtains 15 and 16 is effected through two securing members, which are pressure-responsive for quick-release purposes and are mounted on the head curtain and the side curtains. The preferred form of quick-release securing members shown in the drawing comprise two panel members 40 and 41, FIG. 1, mounted in spaced relation to each other on the face of the head curtain 17 disposed toward the warehouse 2; and two panel members 42 and 43, FIGS. 1 and 6 mounted on the faces of the upper end portions of the side panels 20 and 21, respectively, remote from the warehouse 2, in position to abuttingly engage the panel members 40 and 41, respectively, when the head curtain 17 and the side panels 20 and 21 are disposed in normal, at-rest position, as shown in FIG. 2. Each of the panel members 40—43 includes a base sheet 44, having an adhesive 45 on one face thereof, as shown with respect to the panel members 40 and 42 in FIG. 6. The base sheets may be made of any suitable material, such as the aforementioned canvas duck, and preferably are secured, by suitable means, such as stitching 46, FIG. 5, to the respective faces of the curtains 15-17, on which they are secured, in flat juxtaposition thereto, and with the adhesive 45 thereon facing away from the curtain to which the respective base sheet 44 is secured.

The panel members 42 and 43 carried by the side curtains 15 and 16 are identical in construction, each constituting an elongated, substantially rectangular shaped base sheet 44, as shown in FIG. 6 with respect to the side curtain 15. The panel members 40 and 41 carried by the head curtain 17, also, are identical in construction, except that they are mirror images of each other, and each embodies a triangular shaped base sheet 44.

The fastening members 40–43 are of the type that, when they are pressed into engagement with each other, they firmly but releasably adhere to each other to afford a strong connection between the head curtain 17 and the side curtains 15 and 16, but with the connection being one which may be relatively easily torn apart by a force exerted on the head curtain 17 in a direction outwardly away from the warehouse wall 3. With this construction, engagement of a truck with the head curtain 17 is effective to pull the side curtains 15 and 16 inwardly, the panel members 40–43 firmly securing the curtains 15–17 together for this purpose. However, if the head curtain 17 is engaged from the inside of the warehouse 3, such as, for example, by personnel, equipment or other articles, moving outwardly through the doorway 4 from the warehouse 2, it will automatically release its connection with the side curtains 15 and 16 to thereby afford protection against injury of personnel or equipment, and the like, and also to afford protection against accidentally tearing the head curtain 17 from the dock shelter 1.

The adhesive 45 on the panel members 40–43 may be any suitable material, such as, for example, a suitable pressure-sensitive adhesive material, readily available on the market and which may be repeatedly adhered to and released from each other. However, preferably, the adhesive 45 is a fastening material of the type readily available on the market under the trademark VELCRO, with the adhesive on two of the panel members 40 and 41 or 42 and 43 constituting a brushed suitable material such as, nylon, or the like, to present a fussy face, and the adhesive on the other two panel members 42 and 43 or 40 and 41 comprising a plurality of small hooks formed from nylon, or the like, with the hooks operable to releasably engage in, and thereby adhere to the fussy faces of the respective complementary panel members.

Preferably, the panel members 40 and 41 are disposed immediately adjacent the lower edge of the head curtain 17, and the panel members 42 and 43 are disposed immediately adjacent the free longitudinal edges of the side panels 20 and 21, so that they also serve to prevent the curtains 15–17 from flapping, relative to each other, because of wind, or the like.

From the foregoing, it will be seen that the present invention affords a novel loading dock shelter wherein, although the head curtain 17 may be operatively connected to the side curtains thereof in such a manner that it is effective to pull the side curtains inwardly when the head curtain is operatively engaged by a truck, or the like, the head curtain is connected to the side curtains in such a manner that it will automatically and quickly release therefrom when force is applied thereto in a direction outwardly through the loading dock shelter 1, such as, by engagement therewith by a person moving outwardly from the warehouse 2.

Also, it will be seen that the present invention affords a novel loading dock shelter which is efficient and practical in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A loading dock shelter comprising
   a. a cover comprising
      1. two side curtains having panels adapted to extend along respective sides of a doorway of a warehouse in substantially parallel relation to the plane of said doorway, and
      2. a head curtain adapted to extend along the top of said doorway on the side of said panels remote from said warehouse,
   b. means adapted to be mounted on said warehouse for holding said head curtain and said panels outwardly from said warehouse,
   c. said head curtain
      1. having a normal position wherein portions thereof are disposed in closely adjacent parallel relation to upper end portions of respective ones of said panels, and
      2. being movable in one direction outwardly away from said upper end portions and said doorway, and
   d. means for repeatedly releasably securing said head curtain to said panels for releasably holding said head curtain in said normal position,
   e. said last mentioned means comprising
      1. one securing means mounted on said panels, and
      2. other securing means mounted on said head curtain in position to be releasably attached to said one securing means when said head curtain is disposed in said normal position, and
   f. said other securing means being
      1. responsive to pressure applied to said head curtain in said one direction for releasing said other securing means from said one securing means and thereby releasing said head curtain from said panels for movement away from the latter, and
      2. being re-engageable with said one securing means by directly pressing said one securing means and said other securing means together upon movement of said head curtain back into said normal position for again releasably securing said head curtain to said panels.

2. A loading dock shelter as defined in claim 1, and in which
   a. said means for securing said head curtain to said panels comprise adhesive means.

3. A loading dock shelter as defined in claim 1, and in which
   a. said one securing means are mounted on said upper end portions of said panels,
   b. said other securing means are mounted on the lower edge portion of said head curtain in position to engage respective ones of said one securing means, and
   c. each of said one and other securing means includes adhesive disposed in position to releasably adhere to said adhesive on said respective securing means engaged therewith when said one and other securing means are so abuttingly engaged.

4. A loading dock shelter as defined in claim 2, and in which
   a. said adhesive means on each of said panels comprises brushed material presenting a fuzzy face, and
   b. said adhesive means on said head curtain comprises a plurality of hooks releasably engageable with said fuzzy faces.

* * * * *

UNITED STATES PATENT AND TRADEMARK OFFICE
CERTIFICATE OF CORRECTION

PATENT NO. : 3,915,183
DATED : October 28, 1975
INVENTOR(S) : Sylvan J. Frommelt It is certified that error appears in the above-identified patent and that said Letters Patent are hereby corrected as shown below:

Col. 3, line 40, "discolsed" should be --disclosed--;

Col. 3, line 67, "of", second instance, should be "or";

Col. 5, line 16, insert "and" before "lower";

Col. 5, line 29, insert "to" after "thereto";

Col. 5, line 60, "ot" should be --to--.

Signed and Sealed this ninth Day of March 1976

[SEAL]

Attest:

RUTH C. MASON
*Attesting Officer*

C. MARSHALL DANN
*Commissioner of Patents and Trademarks*